Feb. 16, 1954 J. R. HOLLINS 2,669,704
VEHICLE SIGNALING CIRCUIT
Filed May 7, 1952
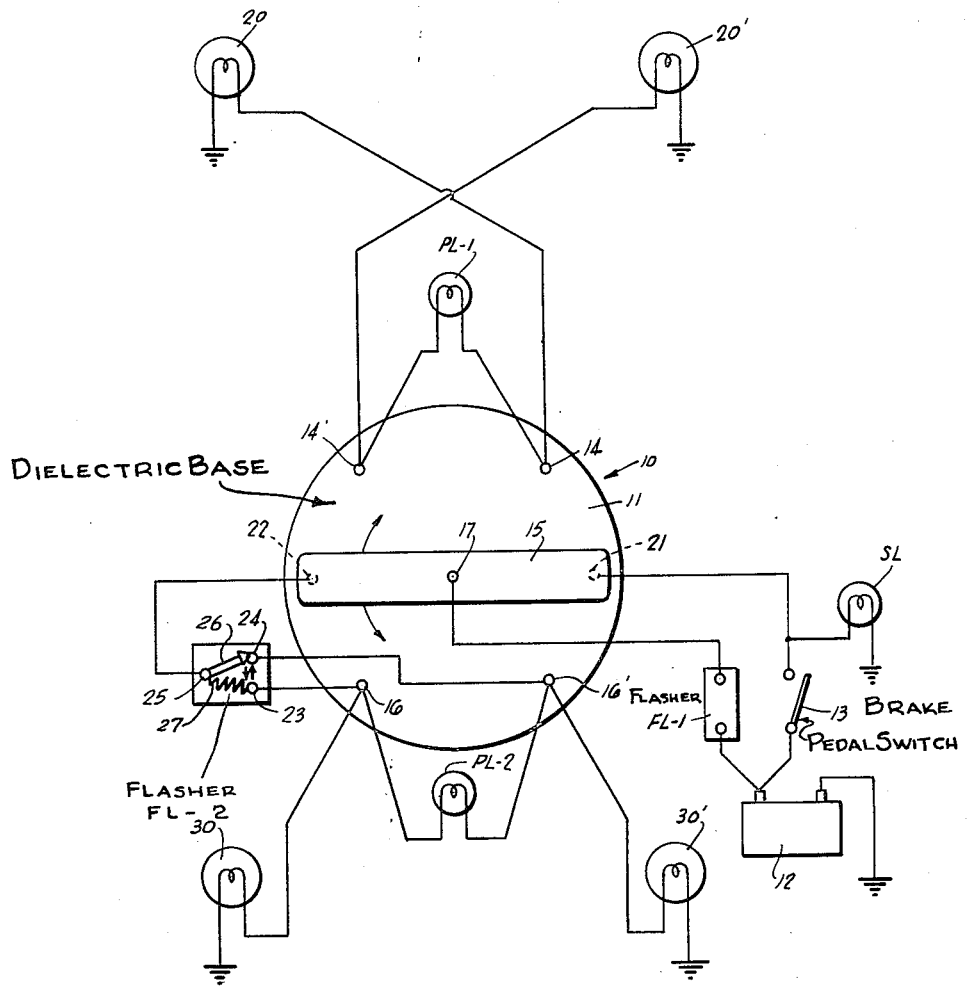

Patented Feb. 16, 1954

2,669,704

UNITED STATES PATENT OFFICE 2,669,704

VEHICLE SIGNALING CIRCUIT

Jesse R. Hollins, Brooklyn, N. Y.

Application May 7, 1952, Serial No. 286,499

4 Claims. (Cl. 340—81)

This invention relates to signalling systems for vehicles, particularly of the automotive type, and more particularly to a novel signalling circuit whereby turn indicating signal lamps are caused to flash whenever the brake-operated stop lamp switch is closed to augment the "stop" signal provided by the usual "stop" lamp or lamps.

The usual stop lamp now standard equipment on most motor vehicles, and energized whenever the brake pedal is operated to decelerate the vehicle, is generally a steady burning lamp. However, a steady burning lamp is not as effective in attracting a driver's attention as is a flashing lamp. Flashing lamps are usually provided as turn signalling indicators on most vehicles, being selectively energized to flash a turn indication by a selector switch mounted on the steering column.

The present invention is directed to a novel signalling arrangement employing turn signal lamps as flashing "stop" lamps augmenting the usual steady burning "stop" lamp or lamps. To this end, a second flasher is connected between the brake pedal operated stop lamp switch and the signal lamps on both sides of the vehicle. This second flasher circuit is in parallel with the usual stop lamp circuit and serves to flash both turn indicating lamps when the brake pedal operated switch is closed. Preferably, the second flasher is an alternating flasher arranged to flash the turn signal lamps in alternation. Thus, both the steady burning stop lamp and alternately flashing "turn" lamps are simultaneously energized to signal slowing or stopping of the vehicle.

For an understanding of the invention principles, reference is made to the following description and accompanying drawing in which the single figure is a schematic circuit diagram of the invention signalling circuit.

Referring to the drawing, a turn indicator selector switch 10 is illustrated as selectively operable to energize either the left signal lamps 20, 30 or the right signal lamps 20', 30' mounted on the front and rear of the vehicle. Energization of the turn signal lamps, such as 20, 20', is selectively effected by means of a contact arm 15 rotatably mounted on a dielectric base 11 carrying contacts connected to the turn signal lamps. The latter are grounded on one side, in the usual manner, and are energized from the grounded vehicle battery (and/or generator) 12 over a circuit including a first flasher FL-1 in series with battery 12.

The vehicle is also provided with the usual steady burning stop lamp SL also energized from battery 12, whenever a switch 13 is closed. Switch 13 is the usual brake operated stop lamp switch.

In the arrangement shown, left front signal lamp 20 is connected to contact 14, and right front signal lamp to contact 14', both on base 11. Similarly, left and right rear signal lamps 30, 30' are respectively connected to contacts 16, 16' on base 11. Flasher FL-1 is connected to the pivot 17 of switch arm 15. A pilot lamp PL-1 is connected across contacts 14, 14', and a pilot lamp PL-2 is connected across contacts 16, 16'.

Assuming it is desired to signal a left turn, arm 15 is turned counter-clockwise approximately 45° to engage contacts 14 and 16. This connects left lamps 20, 30 to battery 12 through flasher FL-1, and the lamps flash to indicate a left turn. Pilot lamps PL-1 and PL-2 are also flashed through right lamps 20', 30' but the high resistance of the pilot lamps prevents a current flow sufficient to illuminate lamps 20', 30'. Should either pilot lamp fail to flash it indicates an open circuit, such as burned out lamps 20', 30' or another circuit break. A right turn is signalled in a corresponding manner.

In accordance with the invention, base 11 is provided with an extra pair of contacts 21, 22 midway between the sets of turn signalling contacts and engaged and interconnected by arm 15 only in the off or neutral position of the arm. Contact 21 is connected to the stop lamp terminal of brake switch 13 in parallel with stop lamp SL. Contact 22 is connected to the "live" terminal 25 of a second flasher FL-2, preferably arranged to alternately energize its output terminals 23, 24. These latter terminals are respectively connected to switch contacts 16, 16'.

The circuit of flasher FL-2 is schematically illustrated in the drawing as including a movable armature 26 and a high resistance wire 27. Armature 26 is pivoted about contact 25 as a center for oscillatory movement (as illustrated by the arrows) for alternately connecting contact 25 with contacts 24 and 23. High resistance wire 27 at all times connects contacts 25 and 23. An insulated connection (not shown) is provided between high resistance wire 27 and armature 26 so that when the high resistance wire is "cold," the armature 26 is normally maintained (as shown in the drawing) so that it connects contacts 25 and 24; the armature 26 being also connected to a biasing spring (not shown) which tends to snap armature 26 out of engagement with contact 24 and into engagement with contact 23', such last-named-biasing action, however, being less than the pull of the high resistance wire (when "cold"), so that armature 26, is as aforesaid, normally maintained in contact with contact 24.

When the flasher is energized, a low resistance current path is provided between contacts 25 and 24, through armature 26 and the current flow in this path is sufficient to illuminate a signal lamp; however, the current flow from contact 25 through the high resistance wire 27 to contact 23 is insufficient to illuminate a signal lamp. This latter current flow heats high resistance wire 27 which expands, releasing its pull on armature 26, and allowing armature 26, under the pull of its biasing spring, to snap out of engagement with contact 24 and into engagement with contact 23. Armature 26 then carries full current from contact 25 to contact 24 and shunts high resistance wire 27. The latter thus cools and contracts and exerts a pull on armature 26 greater than the biasing action of its spring to thereby snap armature 26 back to contact 24; and thereafter the flashing cycle aforementioned repeats.

In the position of switch 10 shown in the drawing, when brake operated switch 13 is closed, stop lamp SL is energized. Simultaneously, flasher SL-2 is energized through switch contacts 21, 22 and switch arm 15. Thus, rear signal lamps, 30, 30' are flashed alternately through flasher terminals 23, 24 and switch terminals 16, 16', pilot lamp PL-2 being alternately flashed through the non-illuminated signal lamps 30 or 30'.

Thus, whenever the brakes are applied with switch 10 in the neutral position, rear signal lamps 30, 30' are flashed in alternation to augment the signalling effect of "steady" stop lamp SL. Furthermore, should switch 10 be operated to indicate a turn while the brakes are applied, the "stop" flashing signal circuit is broken at contacts 21, 22 and the turn signal lamp selectively energized in the normal manner.

While a specific embodiment of the invention has been shown and described in detail to illustrate the application of the invention principles, it will be understood that the invention may be embodied otherwise without departing from such principles.

What is claimed is:

1. In a vehicle having a source of electric energy, a stop lamp, a brake-operated switch controlling energization of said stop lamp from said source, turn signalling lamps, a flasher connected to said source, and a selector switch having contacts and a switch arm selectively operable to connect said signal lamps to said flasher for selectively flashing a right turn or a left turn, the combination of a second flasher having a pair of output terminals respectively connected to a left signal lamp and a right signal lamp; and means, including selector switch contacts independent of the signal lamp contacts and engaged by the switch arm only in the neutral position of said selector switch, operable upon actuation of said brake-operated switch to connect said second flasher to said source in parallel with said stop lamp to flash a pair of left and right signal lamps when said stop lamp is illuminated.

2. In a vehicle having a source of electric energy, a stop lamp, a brake-operated switch controlling energization of said stop lamp from said source, turn signalling lamps, a flasher connected to said source, and a selector switch having contacts and a switch arm selectively operable to connect said signal lamps to said flasher for selectively flashing a right turn or a left turn, the combination of a second flasher having a pair of output terminals respectively connected to a left signal lamp and a right signal lamp; and means, including said selector switch in a selected position, operable to connect said second flasher to said brake-operated switch in parallel with said stop lamp to flash a pair of left and right signal lamps when said stop lamp is illuminated.

3. In a vehicle having a source of electric energy, a stop lamp, a brake-operated switch controlling connection of said stop lamp to said source, left and right front signal lamps, and left and right rear signal lamps the combination of a selector switch having a movable switch arm, a first pair of contacts each connected to a left signal lamp, and a second pair of contacts each connected to a right signal lamp; a flasher connected between said source and said switch arm; said arm being selectively operable to interconnect the contacts of said first pair or the contacts of said second pair to flashingly energize either the left or the right signal lamps; a third pair of contacts on said switch interconnected by said arm only in the neutral position of said switch, one of said third pair of contacts being connected to said brake operated switch in parallel with said stop lamps; and a second flasher having a pair of output terminals each connected to a rear signal lamp and an input terminal connected to the other of said third pair of contacts; whereby, when said switch arm is in the neutral position and the brake is operated, the rear signal lamps are flashed while said stop lamp is illuminated.

4. In a vehicle having a source of electric energy, a stop lamp, a brake-operated switch controlling connection of said stop lamp to said source, left and right front signal lamps, and left and right rear signal lamps the combination of a selector switch having a movable switch arm; a first pair of contacts each connected to a left signal lamp, and a second pair of contacts each connected to a right signal lamp; a flasher connected between said source and said switch arm; said arm being selectively operable to interconnect the contacts of said first pair or the contacts of said second pair to flashingly energize either the left or the right signal lamps; a third pair of contacts on said switch interconnected by said arm only in the neutral position of said switch, one of said third pair of contacts being connected to said brake-operated switch in parallel with said stop lamps; and a second flasher having a pair of alternately energizable output terminals each connected to a rear signal lamp and an input terminal connected to the other of said third pair of contacts; whereby, when said switch arm is in the neutral position and the brake is operated, the rear signal lamps are flashed alternately while said stop lamp is illuminated.

JESSE R. HOLLINS.

References Cited in the file of this patent

UNITED STATES PATENTS

| Number | Name | Date |
| --- | --- | --- |
| 2,122,508 | Bell | July 5, 1938 |
| 2,124,829 | Rioux | July 26, 1938 |
| 2,300,896 | Hosmer | Nov. 3, 1942 |